April 16, 1968   W. J. SANDERS   3,377,859
MEANS FOR MEASURING CHANGE IN RESERVOIR FLUID LEVEL
Filed Dec. 23, 1965
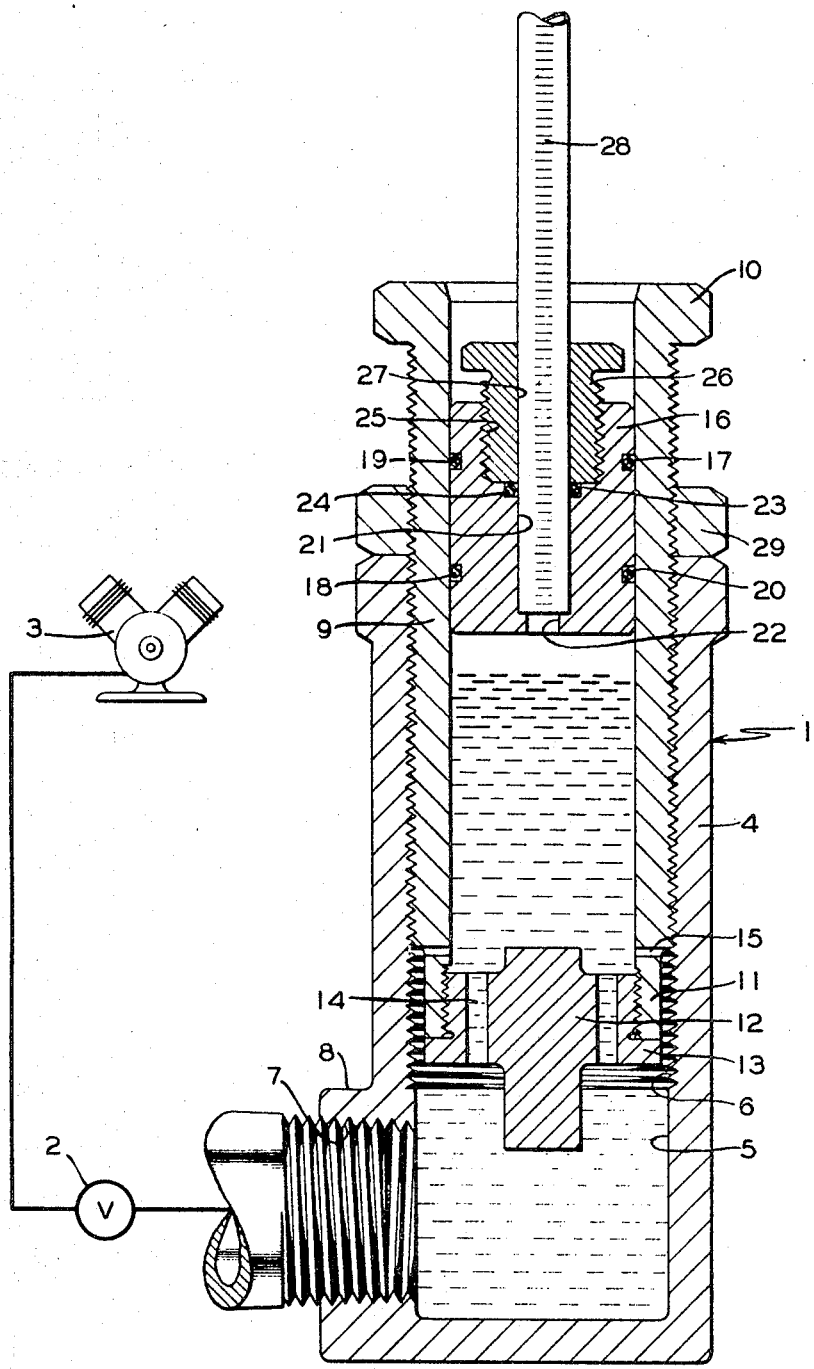
INVENTOR.
Walter J. Sanders
BY Donald P. Rooney
Agent

United States Patent Office

3,377,859
Patented Apr. 16, 1968

3,377,859
MEANS FOR MEASURING CHANGE IN RESERVOIR FLUID LEVEL
Walter J. Sanders, Jeannette, Pa., assignor to Westinghouse Air Brake Company, Wilmerding, Pa., a corporation of Pennsylvania
Filed Dec. 23, 1965, Ser. No. 515,998
4 Claims. (Cl. 73—290)

ABSTRACT OF THE DISCLOSURE

A method and means for measuring the differential in fluid levels in a reservoir, or in the crankcase of a motor, compressor and the like, occurring over a time interval. A plunger of uniform travel, displaces fluid trapped in a cylinder at a level corresponding to the initial level in the reservoir into a capillary tube on which a first reading is taken; a second reading being taken after a given interval. The difference in readings is a measure of differential levels or consumption of liquid.

---

It is well known to those skilled in the art that a reliable way of testing piston and piston ring efficiency is to measure the level of the lubricating oil before the motor is started and again after shutdown. In this way it can be readily ascertained what amount of oil has been lost from the system. Previously various ways have been devised to achieve this; however, they were either too complicated, too expensive or not precise enough to be used successfully and conveniently.

The problem to be solved was to find a simple, inexpensive, accurate way to visually read the fluid level and quickly calculate the differential fluid level, in a manometer type gage, in a crankcase before and after running the motor. The simple dip stick as used ordinarily is ideally suited for rough checking, but its accuracy of calibration is about one-half a quart which is far below the accuracy of one cubic centimeter which is required in many testing procedures. The dip stick is easy to read, easy to operate and used in the crankcase of the motor of almost every domestic automobile and truck. To the other extreme is the high cost electronic equipment which has been successfully used, but it is complicated and requires the special skills of a trained technician to connect, use, read and evaluate the results of the data. Added to the high cost of such test and recording equipment, this solution is out of reach of many testers.

It is the object of the instant invention to provide a novel method employing a simple, inexpensive, accurate, manometer type gage means that can be connected to the crankcase of a device, such as a compressor, whereby the change in crankcase oil level can be read quickly and accurately.

The gage is designed for use in a novel method of measurement which comprises a vertically disposed cylinder selectively connectable to and disconnectable from a crankcase of a device such as a compressor or exhauster through a communication controlled by a valve. A piston, having a calibrated measuring tube of small diameter relative to the diameter of the cylinder secured secured in a bore in said piston, is reciprocable in the cylinder following closure of the valve, to displace oil communicated from the crankcase and within the cylinder into the calibrated tube. By taking a reading on the calibrated tube before and after operation of the compressor for a certain length of time, a measurement of the loss of oil in the crankcase reflected in the lower level therein may be quickly made. Due to the amplification resulting from the smaller diameter of the calibrated tube, a high degree of accuracy is obtained of the differential in the tube readings.

In the accompanying drawings the single figure is a vertical cross-section view of the manometer type gage, in connection with a fluid compressor.

Referring now to the drawings, the manometer type gage 1 is fitted in a fluid system which comprises a conventional valve 2 and a compressor (or exhauster) 3. The gage 1 comprises a cylindrically shaped outer casing 4 having a bore 5 therein which is internally threaded along a portion thereof designated as 6. Perpendicular to, and at the bottom of bore 5, is a boss 8 formed on the outside of casing wall 4 having an internally threaded bore 7 therein which also extends perpendicularly from casing 4 at the bottom end thereof. The fluid system comprising the compressor, valve and necessary plumbing is attached to casing 4 at bore 7 and the remainder of the gage is attached to the casing 4 by way of bore 5. Screwed into the threaded portion 6 of casing 4 is a sleeve 9 having at its upper end a nut 10 and at its lower end an internally threaded boss 11 of lesser diameter than the sleeve. Screwed into boss 11 is an externally threaded stop member 12 having a collar equal in diameter to boss 11, abutting the end of boss 11, when the stop is screwed completely into the boss. The stop 12 has ports 14 and 15 therein which allow fluid to pass from one side of the stop to the other while the stop 12 is tightly screwed into the boss 11 of the sleeve 9. Within the bore of the sleeve 9 a piston 16 is slidably fitted and sealed by O-rings 17 and 18 which are contained in respective peripheral grooves 19 and 20. The piston 16 has a central bore 21 therein. At one end of bore 21 is an orifice 22 by which bore 21 communicates with the chamber formed within sleeve 9. At the upper end of bore 21 is a counterbore 23 of larger diameter in which an O-ring 24 is seated. Concentric to and in juxtaposition with counterbore 23 is a threaded bore 25 of a larger diameter which extends to the other end of the piston 16. Screwed into bore 25 is an externally threaded plug 26 having a central bore 27 therein into which a calibrated manometer tube 28 is frictionally fitted and seated to the bottom of central bore 21 and held fluid tight therein by O-ring 24 which is fitted in counterbore 23.

The manometer type tube 28 extends externally of sleeve 9 so it can be read visually with a minimum of difficulty. Due to the reduced diameter of the manometer tube 28 and the relative internal diameter of sleeve 9, the fluid level in the manometer gage is amplified, under circumstances hereinafter described, thus making it possible to obtain highly accurate readings thereon.

In the operation of the gage, the prime purpose is to measure the oil level in the crankcase of a compressor before and after the compressor is run for a predetermined time interval. This is done by opening valve 2 so the oil can flow into casing 4 by way of bore 7 until the oil level in the compressor and the gage are equalized. When this is achieved, valve 2 is closed and piston 16 along with tube 28 is manually lowered until the bottom end of piston 16 contacts the top end of stop 12. The oil trapped between piston 16 and stop 12 as piston 16 is shifted manually downward cannot escape through ports 14 and valve 2 since valve 2 is closed. Therefore, the fluid will ascend inside tube 28 to a visible level. If this ascertained level is not at a convenient calibration of tube 28, nut 29 can be loosened and nut 10 can be rotated which in turn rotates sleeve 9 inside the casing 4 thus lowering or raising the piston 16 and tube 28, sleeve 9, etc., which in turn raises or lowers the oil level in the tube to a convenient starting calibration. The sleeve is then locked at this calibration by screwing nut 29 tightly against casing 4 which will hold sleeve 9 against rotation in said casing.

After this initial reading, the valve 2 is opened so that all of the oil in the gage will circulate through the compressor 3 and thus be at an ambient temperature with the other oil in the system. The motor or compressor 3 is now run for a predetermined time and then shut down. After a suitable time to allow the temperature of the oil to be restored to that at the start of the run, it is now possible to determine what quantity of oil has been lost from the crankcase system. To achieve this, valve 2 is again closed and the piston 16 is again manually lowered inside sleeve 9 until it contacts stop 12. The fluid level in the tube 28 is then read, recorded and subtracted from the initial reading. The differential of fluid levels, representing the loss of oil, can thus be obtained within one cubic centimeter. This minute calibration and accurate reading is made possible by the differential diameter between the manometer tube 28 and the bore within sleeve 9. Due to this difference in diameter as the manometer 28 and piston 16, etc., descend into the reservoir of oil and stop against the top end of stop member 12, the fluid that is displaced from the reservoir to the manometer tube is amplified in height, thus making it possible to obtain readings quickly and with accuracy.

Although a specific embodiment of the invention has been shown and described, it is with full awareness that modifications thereof are possible. Moreover, it will be apparent that the invention may be employed to measure differences in fluid level in many other applications or devices.

Having now described the invention, what I claim as new and desire to secure by Letters Patent is:

1. Apparatus for measuring the level of liquid in a reservoir means, said apparatus comprising:
    (a) a cylindrical means having a bore therein and a port at its lower end adapted to be connected with a reservoir means and by way of which liquid in the said reservoir means flows to the said bore and its liquid level is equalized with the liquid level in the said reservoir means,
    (b) a piston means operable in said bore,
    (c) stop means in said bore between said port and said piston means to limit travel of said piston means toward said port,
    (d) a calibrated transparent tube means coaxially carried by said piston means and connecting with the bore into which liquid trapped in said bore, following equalization of liquid level in the bore and said reservoir means rises upon operation of said piston means into contact with said stop means.

2. The appartus of claim 1 wherein the cross-sectional area of said calibrated transparent tube means is less than the cross-sectional area of said bore so that any differential liquid level in the said calibrated transparent tube means is amplified with respect to any differential liquid level in the said bore.

3. The apparatus of claim 1 wherein said cylindrical means comprises a hollow internally threaded cylinder having an externally threaded tube means adjustably screwed thereinto, said tube means having said stop means fitted to one end thereof and above said port and said piston means being mounted for reciprocation in said tube means.

4. The apparatus of claim 1, further characterized by valve means for closing communication between the reservoir means and said bore after the liquid level in the said bore and the reservoir means has been equalized, whereby when the piston means is reciprocated to the said stop means fluid is displaced into said calibrated transparent tube means.

References Cited

UNITED STATES PATENTS

| | | | |
|---|---|---|---|
| 1,521,195 | 12/1924 | Johnson | 73—290 |
| 1,830,116 | 11/1931 | Kruft | 73—290 |
| 2,159,275 | 5/1939 | Kinney | 73—290 |
| 2,645,125 | 7/1953 | Miller | 73—290 |

LOUIS R. PRINCE, *Primary Examiner.*

D. O. WOODIEL, *Assistant Examiner.*